US008965330B2

(12) United States Patent
Raj et al.

(10) Patent No.: US 8,965,330 B2
(45) Date of Patent: Feb. 24, 2015

(54) SPLIT BILLING FOR A MOBILE DEVICE

(75) Inventors: Himanshu Raj, Issaquah, WA (US); Stefan Saroiu, Redmond, WA (US); Alastair Wolman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 504 days.

(21) Appl. No.: 13/278,179

(22) Filed: Oct. 21, 2011

(65) Prior Publication Data

US 2013/0102276 A1    Apr. 25, 2013

(51) Int. Cl.
*H04M 11/00* (2006.01)
*H04M 15/00* (2006.01)
*H04L 12/14* (2006.01)
*H04W 4/24* (2009.01)

(52) U.S. Cl.
CPC ........... *H04M 15/09* (2013.01); *H04L 12/1475* (2013.01); *H04M 15/07* (2013.01); *H04M 15/43* (2013.01); *H04W 4/24* (2013.01); *H04L 12/1457* (2013.01)
USPC ............................ 455/406; 455/407; 455/408

(58) Field of Classification Search
CPC ......... H04W 4/24; H04W 8/02; H04W 12/08; H04W 28/02; H04W 12/06; H04W 8/18; H04W 8/26
USPC ........... 455/406, 411, 418, 403, 404.1, 404.2, 455/405, 408, 412.1, 412.2; 370/432; 725/100; 709/224, 225, 203; 379/114.83; 700/295; 705/34, 412
See application file for complete search history.

(56) References Cited

U.S. PATENT DOCUMENTS

| | | | |
|---|---|---|---|
| 7,499,401 B2 | 3/2009 | Buddhikot et al. | |
| 2005/0255886 A1 | 11/2005 | Aaltonen et al. | |
| 2007/0297583 A1* | 12/2007 | Shan | 379/114.03 |
| 2008/0057923 A1* | 3/2008 | Pousti | 455/414.3 |
| 2009/0183009 A1 | 7/2009 | Delfs et al. | |
| 2010/0292556 A1 | 11/2010 | Golden | |
| 2012/0089727 A1* | 4/2012 | Raleigh et al. | 709/224 |

OTHER PUBLICATIONS

Roto, et al., "Data Traffic Costs and Mobile Browsing User Experience", Retrieved at <<http://www2.research.att.com/~rjana/MobEA-IV/PAPERS/MobEA_IV-Paper_7.pdf>>, Proceedings of the 4th MobEA Workshop on Empowering the Mobile Web (WWW), May 23, 2006, pp. 1-6.

Gazis, et al., "A Flexible Charging & Billing Approach for the Emerging UMTS Network Operator Role", Retrieved at <<http://citeseerx.ist.psu.edu/viewdoc/download?doi=10.1.1.18.1346&rep=rep1&type=pdf>>, Applied Telecommunication Symposium, Apr. 22-26, 2001, pp. 7.

(Continued)

*Primary Examiner* — Mazda Sabouri
(74) *Attorney, Agent, or Firm* — Steve Wight; Alin Corie; Micky Minhas (57) ABSTRACT

The claimed subject matter provides a method for split billing. The method includes receiving a requested token. The requested token specifies conditions under which network traffic is allowed to be billed against a third party for content requested from a mobile computing device. The method also includes matching network traffic between the mobile computing device and a content provider to the specified conditions. The method further includes metering the matched network traffic to a billing account for the third party.

12 Claims, 5 Drawing Sheets

(56) References Cited

OTHER PUBLICATIONS

Hussin, et al., "E-Pass Using DRM in Symbian v8 OS and TrustZone : Securing Vital Data on Mobile Devices", Retrieved at <<http://eprints.lancs.ac.uk/22916/1/getPDF13.pdf>>, International Conference on Mobile Business (ICMB), Jun. 26-27, 2006, pp. 5.

Sohr, et al., "Software security aspects of Java-based mobile phones", Retrieved at <<http://www.informatik.uni-bremen.de/~sohr/papers/sac11.pdf>>, Proceedings of the ACM Symposium on Applied Computing, Mar. 21-25, 2011, pp. 1494-1501.

"WindRider: A Mobile Network Neutrality Monitoring System", Retrieved at <<http://www.cs.northwestern.edu/~ict992/mobile.htm, Retrieved Date: Aug. 2, 2011, pp. 3.

"ARM Security Technology—Building a Secure System using TrustZone Technology", Retrieved at <<http://infocenter.arm.com/help/topic/com.arm.doc.prd29-genc-009492c/PRD29-GENC-009492C_trustzone_security_whitepaper.pdf>>, ARM Technical White Paper, 2005-2009, pp. 108.

Dischinger, et al., "Glasnost: Enabling End Users to Detect Traffic Differentiation", Retrieved at http://citeseerx.ist.psu.edu/viewdoc/download?doi=10.1.1.164.830&rep=rep1&type=pdf>>, In Proceedings of the 7th USENIX Symposium on Networked Systems Design and Implementation (NSDI), 2010, pp. 14.

Huang, et al., "Anatomizing Application Performance Differences on Smartphones", Retrieved at <<http://www.cs.ucsb.edu/~ebelding/courses/284/papers/smartphones.pdf>>, Proceedings of the 8th international conference on Mobile systems, applications, and services, Jun. 15-18, 2010, pp. 13.

Liu, et al., "Experiences in a 3G Network: Interplay between the Wireless Channel and Applications", Retrieved at <<http://citeseerx.ist.psu.edu/viewdoc/download?doi=10.1.1.142.8214&rep=rep1&type=pdf>>, Proceedings of the 14th ACM international conference on Mobile computing and networking (MOBICOM), Sep. 14-19, 2008, pp. 12.

McCune, et al., "TrustVisor: Efficient TCB Reduction and Attestation", Retrieved at <<http://citeseerx.ist.psu.edu/viewdoc/download?doi=10.1.1.168.6168&rep=rep1&type=pdf>>, In Proceedings of IEEE Symposium on Security and Privacy, Mar. 9, 2009, pp. 17.

McCune, et al., "Flicker: An Execution Infrastructure for TCB Minimization", Retrieved at <<http://citeseerx.ist.psu.edu/viewdoc/download?doi=10.1.1.131.3212&rep=rep1&type=pdf>>, Proceedings of the 3rd ACM SIGOPS/EuroSys European Conference on Computer Systems, Apr. 1-4, 2008, pp. 14.

Qian, et al., "Characterizing Radio Resource Allocation for 3G Networks", Retrieved at <<http://www.cse.umich.edu/~zmao/Papers/RRC3G_imc2010.pdf>>, Proceedings of the 10th annual conference on Internet measurement (IMC), Nov. 1-3, 2010, pp. 14.

"Mobile Broadband Capacity Constraints and the Need for Optimization", Retrieved at <<http://www.rysavy.com/Articles/2010_02_Rysavy_Mobile_Broadband_Capacity_Constraints.pdf>>, RYSAVY Research, Feb. 16, 2010, pp. 1-31.

Santos, et al., "Trusted Language Runtime (TLR): Enabling Trusted Applications on Smartphones", Retrieved at <<http://research.microsoft.com/en-us/um/people/alecw/hotmobile-2011.pdf>>, Proceedings of the 12th Workshop on Mobile Computing Systems and Applications, Hotmobile, Mar. 1-2, 2011, pp. 6.

Seshadri, et al., "SecVisor: A Tiny Hypervisor to Provide Lifetime Kernel Code Integrity for Commodity OSes", Retrieved at <<http://citeseerx.ist.psu.edu/viewdoc/download?doi=10.1.1.137.8319&rep=rep1&type=pdf>>, Proceedings of twenty-first ACM SIGOPS symposium on Operating systems principles, Oct. 14-17, 2007, pp. 17.

Tariq, et al., "Detecting Network Neutrality Violations with Causal Inference", Retrieved at <<http://citeseerx.ist.psu.edu/viewdoc/download?doi=10.1.1.164.1951&rep=rep1&type=pdf>>, Proceedings of the 5th international conference on Emerging networking experiments and technologies, (CoNEXT), Dec. 1-4, 2009, pp. 289-300.

"Trusted Computing Group PC Client Specific TPM Interface Specification (TIS)", Retrieved at <<http://www.trustedcomputinggroup.org/files/resource_files/87BCE22B-1D09-3519-ADEBA772FBF02CBD/TCG_PCClientTPMSpecification_1-20_1-00_FINAL.pdf>>, Jul. 11, 2005, pp. 1-70.

* cited by examiner

SPLIT BILLING FOR A MOBILE DEVICE

BACKGROUND

The scarcity of spectrum for mobile broadband networks is a challenge for stakeholders in the mobile landscape, such as users, content providers, and mobile operators (MOs). As users migrate more computing tasks to smartphones and tablets using mobile networks, the scarcity can be expected to worsen. In response to these challenges, the MOs are taking steps to alleviate this scarcity. The MOs may improve network capacity with updates to network infrastructure, such as purchasing more spectrum, increasing spatial reuse by deploying a higher density of cell towers, or deploying femtocells to homes and small businesses. However, such updates incur significant costs.

Given the current capacity crunch, MOs typically address this challenge by limiting network use, including the imposition of bandwidth caps. Bandwidth caps are typically implemented through plans that set a threshold on the amount of data that can be sent over the mobile network without incurring overage charges. When a subscriber consumes data beyond the alloted threshold, the additional data is billed at a higher rate to disincentivize users from consuming large amounts of data.

Other approaches to limit network use include limiting the types of applications that users are allowed to run over the mobile network, using traffic shaping to reduce performance when a subscriber consumes more than the alloted threshold, and disabling OS features such as tethering. Tethering enables a smartphone to provide network access to a laptop computer, thereby increasing the potential for high bandwidth consumption over mobile networks. These approaches reduce the flexibility for mobile users, and limit the number of mobile users that a content provider may otherwise reach.

In some cases, large content providers are even entering the mobile ISP business, and striking deals with existing MOs for revenue sharing and traffic prioritization. However, users are left out of such deals and may lack means to benefit from them because once a user has reached their bandwidth threshold, the user can no longer benefit from the increased access.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in simplified form as a prelude to the more detailed description that is presented later.

The claimed subject matter provides a method for split billing. The method includes receiving a requested token. The requested token specifies conditions under which network traffic is billed against a third party for content requested from a mobile computing device over a mobile broadband network (or any network where there is usage-based billing). The method also includes matching network traffic between the mobile computing device and a content provider to the specified conditions. The method further includes metering the matched network traffic to a billing account for the third party.

The claimed subject matter provides a system for split billing. The system includes a processing unit and a system memory. The system memory includes code configured to direct the processing unit to perform split billing. A requested token is received that specifies conditions under which network traffic is billed against a third party for content requested from the mobile computing device. Network traffic between the mobile computing device and a content provider is matched to the specified conditions using a secure runtime environment. The matched network traffic is metered to a billing account for the third party, using the secure runtime environment. A data service charge for the matched network traffic is credited on an account for the mobile computing device. The third party is charged for the data service charge.

Additionally, the claimed subject matter includes a computer-readable storage media. The computer-readable storage media includes code configured to direct a processing unit to receive a requested token that specifies conditions under which network traffic is billed against a third party for content requested from the mobile computing device. Network traffic between the mobile computing device and a content provider is matched to the conditions specified by the token, using a secure runtime environment. The matched network traffic is metered to a billing account for the third party, using the secure runtime environment. The content provider is a cloud service or a website. A data service charge for the matched network traffic is credited on an account for the mobile computing device. The third party is charged for the data service charge. The data service charge comprises a mobile network bandwidth cost of the request.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, the terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e,g., card, stick, and key drive, among others). In contrast, computer-readable media generally (i.e., not storage media) may additionally include communication media such as transmission media for wireless signals and the like.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

In one embodiment, a network architecture is provided that may accommodate content providers, both big and small. The network architecture provides split billing for data usage on mobile broadband networks (or any network where there is usage-based billing). Split billing enables content providers pay for the traffic generated by mobile users visiting their websites or using their services. This architecture allows for transparency between the content providers, mobile operators, and users. This architecture removes the barriers between content providers and customers, meaning that a provider can enter into agreements with their customers to offer to pay for specific network traffic. This architecture may be implemented without the cooperation of the mobile operators (MOs) for such agreements. However, the MOs may continue to participate in such bandwidth cost sharing agreements. The architecture may implemented on smartphones and tablets, or even other mobile computing devices including laptops and netbooks.

Figure 1:
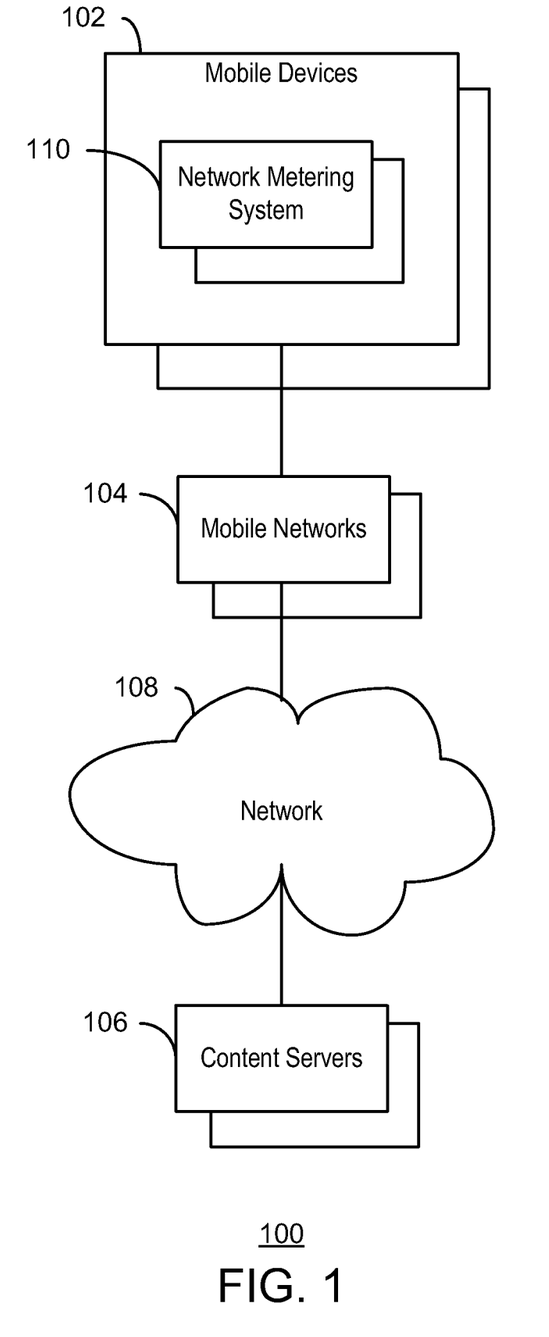
FIG. 1 is a system for split billing operating in accordance with the claimed subject matter.

FIG. 1 is a system 100 for split billing, operating in accordance with the claimed subject matter. The system 100 may include mobile computing devices (devices)102, mobile networks 104, content servers 106, and a network 108. The devices 102 may include mobile computing devices, such as smartphones, computer tablets, and other mobile computing devices, operated by mobile users. The mobile networks 104 may include mobile broadbandnetworks operated by mobile operators. The content servers 106 may include web servers, cloud servers, and other computing architectures that provide content to various users. The network 108 may include any network or combination of networks that provide access to the content servers 106. In one embodiment, the network 108 may be the Internet.

Typically, a mobile user enters into an agreement with the mobile operator for access from the device 102 to the mobile network 104 for both voice and data services. For data services, the mobile networks 104 provide access to content servers 106 over the network 108. The devices 102 may retrieve content by accessing websites or cloud services from content servers 106.

In one embodiment, the devices 102 may include a network metering system 110 that creates billing accounts and meters traffic associated with each billing account. This may alternatively be accomplished using the mobile networks 104 or content servers 106. However, changing the networks 104, and servers 106 may be expensive. The creation of multiple billing accounts and metering traffic to be associated with each billing account can also be accomplished without involving the devices 102. Instead, this may alternatively be accomplished by implementing support within the networks 104 or directly on the servers 106. However, modifying the networks 104 and servers 106 may be expensive. The network metering system 110 is described in greater detail with respect to FIG. 2.

This system 100 enables any content provider to pay solely for the traffic that users generate to their own sites. Advantageously, the system 100 could give MOs additional incentives to invest in their network infrastructure because it increases the pool of customers by including content providers (or any third-party) who may be willing to pay higher prices than individual consumers can tolerate.

The system 100 enables a user to identify a certain type of traffic meant for a certain content server 106 and mobile device 102 for use at a particular time to be billed against the user's data service plan. In this way, the system 100 provides a mechanism to allow content providers of any size to compete for user traffic by offering to compensate users for bandwidth consumption when the users visit their content servers 106, e.g., websites. Bandwidth-intensive websites, such as those streaming movies, may enable mobile users to visit them without having to pay for exceeding bandwidth caps. Bandwidth caps are the limits some mobile operators put on data services plans in order to conserve bandwidth on the mobile networks 104. In another use of the system 100, the mobile user may create a billing account enabling them to bill bandwidth costs for enterprise VPN traffic (and other work-related applications) directly to their employer. In this way, mobile users may use a single device 102 for both work and personal use.

Additionally, the devices 102 can run applications, such as peer-to-peer applications, where the traffic generated by the application is done on behalf of another user or device 102. For example, parents may want their children to run continuous monitoring applications on the children's smartphones to let the parents know where they are. Parents can encourage children to run these applications by having their monitoring usage billed to the parents' phones.

The individual MOs can choose what payment options it accepts from its mobile users. For example, sonic operators might choose to keep the mobile user solely responsible for paying the entire data bill. In this case, mobile users are responsible for collecting their own payments directly from any content providers or other third parties they entered agreements with. Alternatively, the MO may choose to act as an intermediary between mobile users and third parties, offering a billing system in which both mobile users and third parties share the responsibility of making payments. Such flexibility may enable MOs to differentiate their services from each other.

Alternatively, content providers and mobile operators can also form agreements without burdening the mobile user. The system 100 may enable any content provider to enter agreements with MOs regarding their network traffic. Advantageously, the system 100 may be implemented using the capabilities of today's off-the-shelf mobile devices 102, without changes to the networks 104, 106. This is advantageous because changes to the networks 104, 106 raise deployment costs.

Further, the system 100 may provide accountability. Any of the stakeholders, whether a mobile user, third party, or mobile operator, may be able to verify who is responsible for which data plan charges. The performance overhead may also be negligible to mobile users.

The system 100 also provides for an incremental deployment. An incremental deployment means that the system may be deployed without coordination with the MOs or having the MOs change the mobile networks 104. In particular, the system 100 may be deployed in such a way that content providers (or other billing entities) can directly form relationships with end users. In this way, the system 100 may lower the barriers to entry for content providers to subsidize their customers' bandwidth costs. This flexible agreement framework provides a level playing field for all content providers, big and small.

Additionally, the content providers may indirectly fund infrastructure improvements to the mobile networks 104 in a way that makes sense from a revenue and profit perspective. The content providers understand how much the additional user traffic is worth to them in terms of additional profit, and therefore they can subsidize the users' traffic accordingly.

Figure 2:
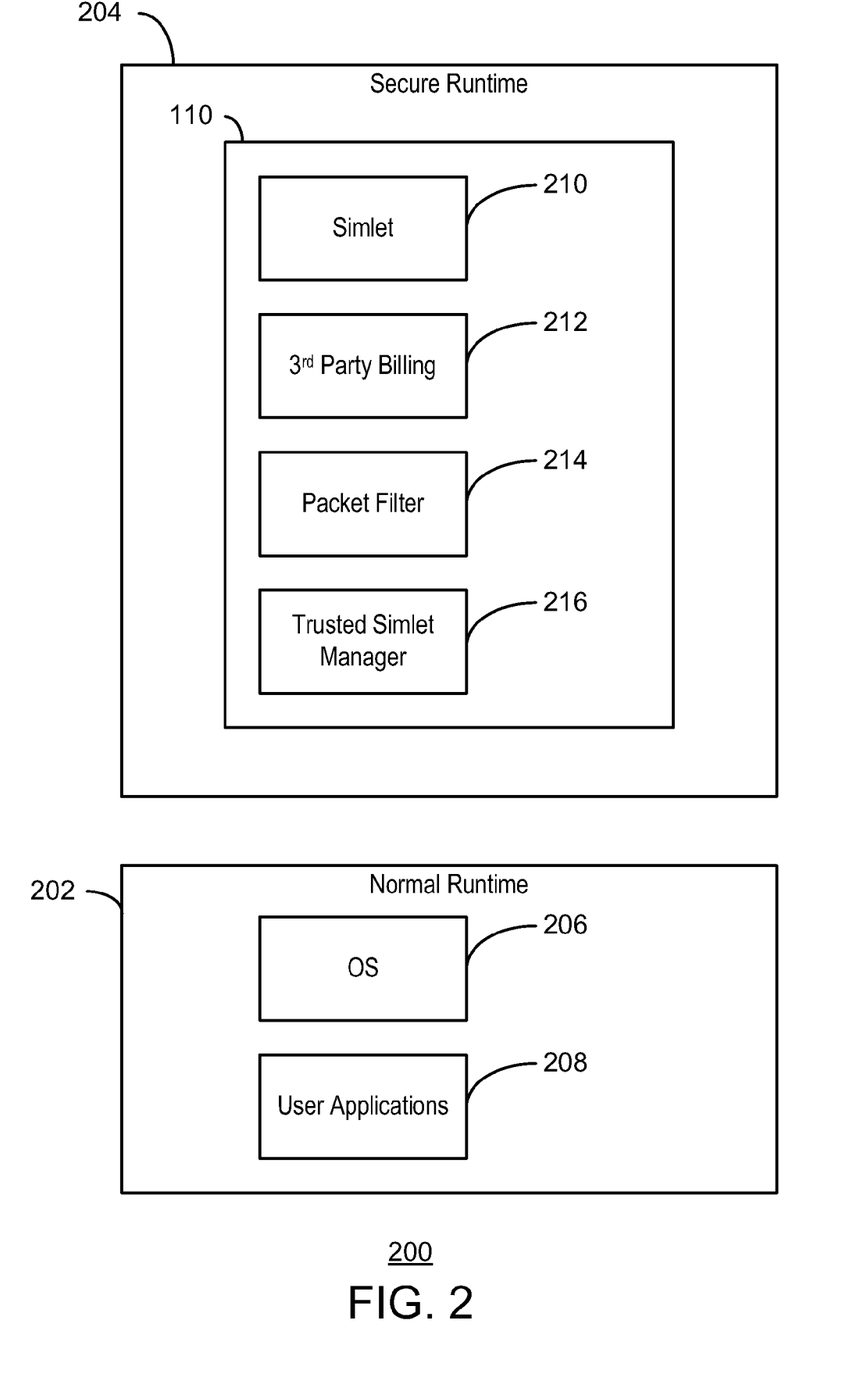
FIG. 2 is a method for split billing in accordance with the claimed subject matter.

FIG. 2 is a block diagram of a software environment 200 of the mobile device 102, operating in accordance with the claimed subject matter. In one embodiment, the software environment 200 may include the network metering system 110, which runs in an isolated trusted excecution environment on the mobile device 102 that implements split billing. On each device 102, the network metering system 110 manages a set of rules on how to bill data services. For example, data consumed by visiting Netflix® could be billed to the user's Netflix® account, whereas data consumed over an enterprise VPN connection could be billed to the user's employer. The network metering system 1110 may run strongly isolated from the rest of the environment 200 in such a way that any security compromise (including an OS compromise) does not compromise network metering. The network metering system 110 may rely on the mobile device's trusted computing features (e.g., ARM TrustZone) to provide a trusted execution environment isolated from the rest of the software environment 200, and for producing an attestation of each bill. The attestation of the bill may be produced using a concept similar to the remote attestation mechanism provided by trusted platform modules (TPMs).

With TrustZone, ARM offers two runtime environments, a normal runtime 202, and a secure runtime 204. An operating system (OS) 206 and user applications 208 run in the normal runtime 202. Any trusted component runs in the secure runtime 204. The ARM TrustZone offers hardware support for memory protection of the secure runtime 204, which means that the OS 206 cannot access any memory allocated to the secure runtime 204. During the boot process, the device 102 first initializes the secure runtime 204 in isolated memory dedicated to the secure runtime 204, before passing control to the normal runtime 202 where the OS 206 boots. This isolated memory maintains the state of all the code running in the secure runtime 204, and cannot be addressed from the normal runtime 202. The typical way to transition between runtimes 202, 204 is via the ARM secure monitor call (smc) instruction, which invokes a secure monitor that performs the context switch. Alternatively, interrupts can be mapped to the different runtimes 202, 204, and when an interrupt occurs for the runtime that is not currently executing, the secure monitor is invoked to handle the interrupt. Setting up the interrupt mapping is controlled by the secure runtime 204 when the device boots. The network metering system 110 maps the mobile device interrupts to the secure runtime 204 to ensure that its metering functionality cannot be disabled by a compromised OS 206.

The network metering system 110 may include a SIMlet 210, third party billing 212, a packet fitter 214, e.g., the Berekely Packet Filter, and a trusted SIMlet manager 216. The name, SIMlet, is a derivative of SIM, from subscriber identity module, e.g., the SIM card in mobile devices 102. The Sim card is an integrated circuit that securely stores keys that identify a "subscriber," i.e., mobile user, on the mobile device 102 to the mobile network 104. This enables the mobile operators to bill the user for use of the mobile network 104.

In contrast, a SIMlet 210 is a token that acts as a simple packet filter to associate individual data traffic with specific billing accounts, thereby generating third party billing 212. The third party billing may 212 may include separate accounts for various content providers, employers, and other third parties. Today, some mobile phones support dual SIM cards. The SIMlets 210 may be regarded as the equivalent of being able to insert multiple SIM cards into a phone, along with a set of rules that indicate which traffic should be billed to which SIM card.

In one embodiment, the SIMlet 210 may use the Berkeley Packet Filter (BPF) 214. The BIT 214 provides, on some Unix-like systems, a raw interface to data link layers, permitting raw link-layer packets to be sent and received. In addition, the BPF 214 supports filtering packets, so that only packets destined for recognized third parties are identified. The SIMlet 210 may also use the ARM TrustZone feature built into modern ARM System-on-Chip's (SoCs) to provide the secure runtime environment 204 for the SIMlets 210. Using TrustZone enables trustworthy metering of which traffic is assigned to which billing account even if malware infects the OS 206.

Each SIMlet 210 corresponds to a billing account, is issued by a content provider, and is destined to a mobile device 102. The SIMlet 210 also includes a rule that specifies the conditions under which data is allowed to be billed against a third party. For example, Netflix® could issue a SIMlet whose policy specifies that all 3G data to or from netflix.com is paid for by Netflix®.

Markup Language 1 depicts an example SIMlet 210 in XML format:

```
<simlet>
    <issuer>simletSRV01.DOMAIN.NAME</issuer>
    <recipient>PHONE-NUMBER</recipient>
    <time>
        <start>START.DATE</start>
        <end>END.DATE</end>
    </time>
    <bpf_filter>dst host DOMAIN.NAME</bpf_filter>
    <signature>Simlet's signature</signature>
</simlet>
MARKUP LANGUAGE 1
```

In this example, the issuer of the SIMlet is a third party identified by DOMAIN NAME, and the recipient is a mobile user identified by their PHONE NUMBER. The SIMlet 210 may have a START DATE and an END DATE, and may be used only during this time. Markup Language 1 uses BPF syntax to specify the SIMlet's policy, although SIMlets 210 could use a more expressive policy language. SIMlets 210 may also be signed by their issuers to prevent fraud through modification.

The trusted SIMlet manager 216 may request and store SIMlets 210. The SIMlet manager 216 may run inside the secure runtime 204, and is therefore isolated from the OS 206 and applications 208. However, any application 208 may invoke the SIMlet manager 216 to request a SIMlet 210 from a content server 106. The SIMlet manager is a piece of code whose job is to manage SIMlets 210. The SIMlet manager runs in the secure runtime 204. Any application, however, can call into the secure runtime to access any service. In this case, any application can invoke the SIMlet manager to request access to a SIMlet 210. The SIMlet 210 is a piece of data which is signed and can be passed to anyone. There's nothing secret about the SIMlet 210 itself. However, billing traffic against a particular SIMlet 210 may be restricted to being performed by the secure world.

Figure 3:
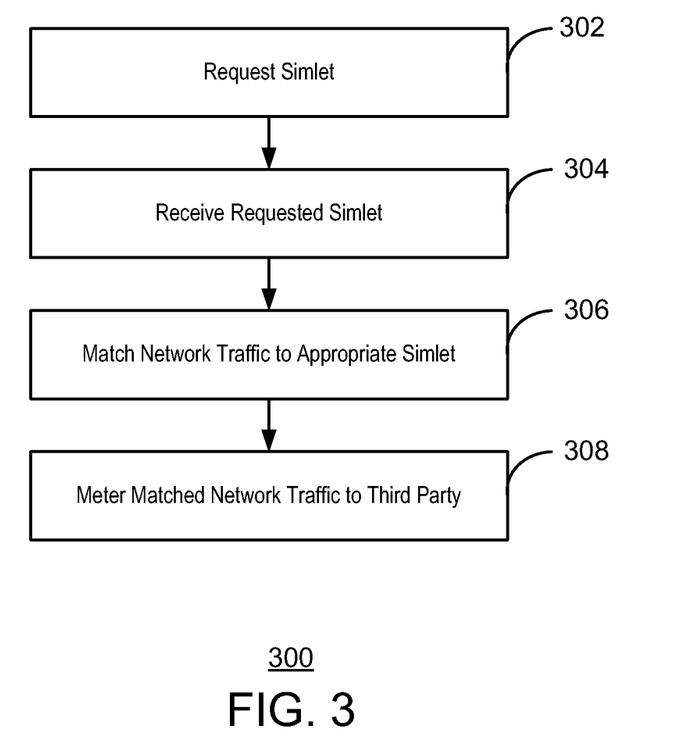
FIG. 3 is a process flow diagram of a method for split billing, in accordance with the claimed subject matter.

FIG. 3 is a process flow diagram of a method 300 for split billing, in accordance with the claimed subject matter. The method 300 may be performed by the network metering system 110. It is noted that the process flow diagram is not intended to indicate a particular order of execution. The method 300 begins at block 302, where the network metering system 110 may request a SIMlet 210 from a content provider. As stated, an application 208 may invoke the trusted SIMlet manager 216 to request a SIMlet 210 from the content server 106. The SIMlet manager 216 may contact the content server 106, authenticate to it, and request the SIMlet 210. The trusted SIMlet manager 216 may authenticate to the content server 106 using either primitives provided by the physical SIM card, or using TPM-like remote attestations.

At block 304, the network metering system 110 may receive the requested SIMlet 210, if the request is successful. The trusted SIMlet manager 216 may store the SIMlet 210 locally. Additionally, the SIMlet manager 216 may signal to the application 208 whether the SIMlet request was successful or not.

Once the content server 106 issues the SIMlet 210, the content provider is commited to paying for a portion of the user's traffic to the provider's servers. The content provider may share this information with the MO if it wishes to do so. This could help with streamlining the customer's payment process, or it could form the basis for further negotiations between the MO and the content provider with respect to bandwidth prices.

At block 306, the network metering system 110 may match network traffic to the appropriate SIMlet 210. For this, the application 208 may explicitly request that the network metering system 110 bill the application's traffic against a particular SIMlet 210. In one embodiment, the network metering system 210 may instantiate a matching rule in a forwarding table that matches the application's traffic, and meter the traffic accordingly. In one embodiment, this may be accomplished using sockets and packet filters.

When opening a socket, the application 208 requests the SIMlet 210. As a result, the requested SIMlet 210 is bound to the socket. This binding operation allows applications 208 to decide which SIMlets 210 they want to use, which enables the mobile user to have control of this process. Once a socket has been bound to the SIMlet 210, the OS 206 may send all outgoing network traffic from the socket buffer to the Trust-Zone secure runtime 204. Once in the secure runtime 204, the SIMlet packet filter rules are evaluated for billing, and the data is handed to the network stack. For incoming traffic, the network stack in the secure runtime decides which packets are destined to which sockets, and then checks if the socket has a SIMlet 210 bound to it. If so, the SIMlet 210 is evaluated, and then the packets are handed off from the secure runtime 204 back to the socket buffer in the normal runtime 202. CODE 1 shows an example in C# of how to create a TCP socket and bind a SIMlet 210 from DOMAIN.NAME to the socket.

```
// find a simlet that can be used for our destination
IPSimlet ips = IpSimlet.DefaultSimlet;
foreach (IPSimlet tmp in SimletStorage) {
    if(tmp.Issuer.Contains("DOMAIN.NAME")) {
        ips = tmp;
    }
}
// create socket
Socket s = new Socket(AddressFamily.InterNetwork, SocketType.Stream, ProtocolType.TCP);
IPHostEntry ipHostinfo = Dns.Resolve("DOMAIN.NAME");
IPAddress ipAddress = ipHostInfo.AddressList[0];
IPEndPoint ipe = new IPEndPoint(ipAddress, 80);
// bind the simlet to the socket
s.BindSimlet(ips);
//connect
try {
    s.connect( )
} catch(SimletException sime) {
    Console.WriteLine("SimletException: {0}", sime.ToString( ));
} catch(SocketException socke) {
    Console.WriteLine("SocketException: {0}", socke.ToString( ));
} catch(Exception e) {
    Console.WriteLine("Unexpected exception: {0}", e.ToString( ));
}
CODE 1
```

At block 308, the network metering system 110 may meter the matched network traffic to a billing account for the third party providing the SIMlet 210. In one embodiment, the network metering system 110 may periodically produce a bill that tallies data traffic consumed against each of the third parties providing SIMlets 210 to the mobile user.

Figure 4:
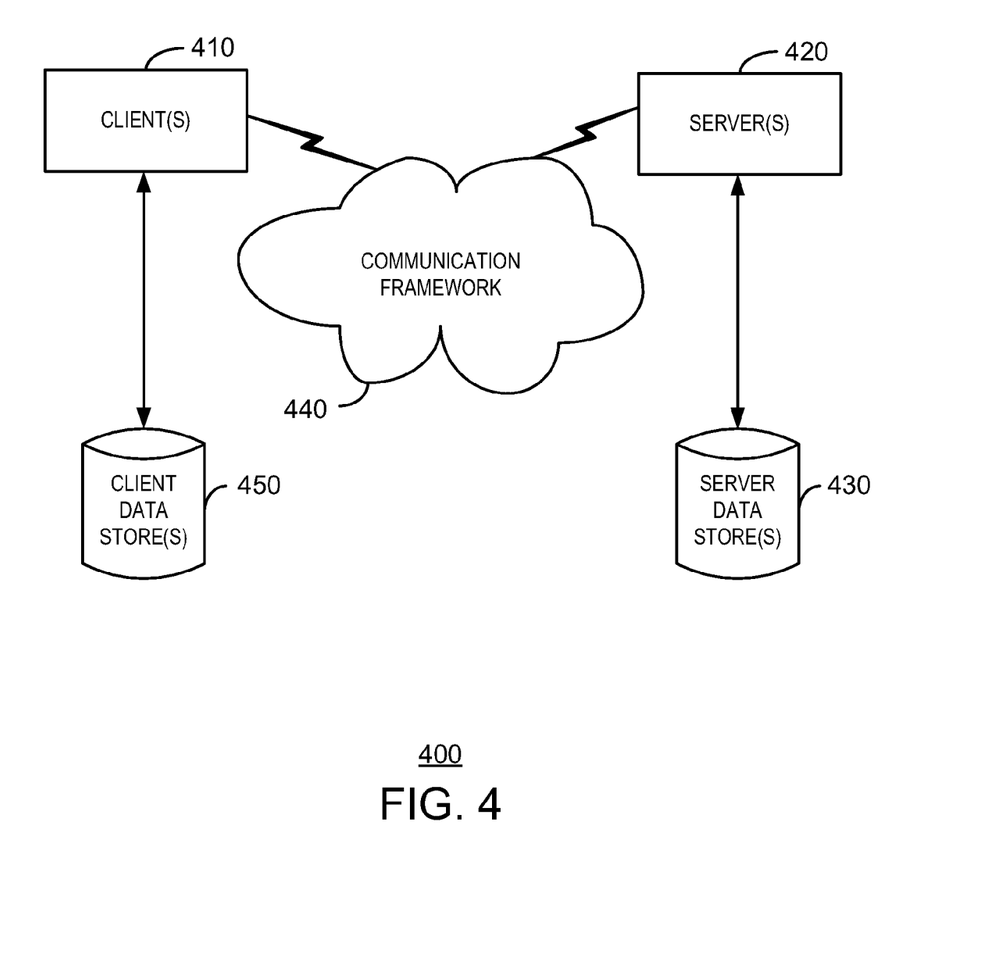
FIG. 4 is a block diagram of an exemplary networking environment for implementing various aspects of the claimed subject matter.

FIG. 4 is a block diagram of an exemplary networking environment 400 wherein aspects of the claimed subject matter can be employed. Moreover, the exemplary networking environment 400 may be used to implement a system and method that executes transactions on a distributed platform, as described herein.

The networking environment 400 includes one or more client(s) 402. The client(s) 402 can be hardware and/or software (e.g., threads, processes, computing devices). As an example, the client(s) 402 may be computers providing access to servers over a communication framework 408, such as the Internet.

The environment 400 also includes one or more server(s) 404. The server(s) 404 can be hardware and/or software (e.g., threads, processes, computing devices). The server(s) 404 may include content servers 106. The server(s) 404 may be accessed by the client(s) 402.

One possible communication between a client 402 and a server 404 can be in the form of a data packet adapted to be transmitted between two or more computer processes. The environment 400 includes a communication framework 408 that can be employed to facilitate communications between the client(s) 402 and the server(s) 404.

The client(s) 402 are operably connected to one or more client data store(s) 410 that can be employed to store information local to the client(s) 402. The client data store(s) 410 may be located in the client(s) 402, or remotely, such as in a cloud server. Similarly, the server(s) 404 are operably connected to one or more server data store(s) 406 that can be employed to store information local to the servers 404.

Figure 5:
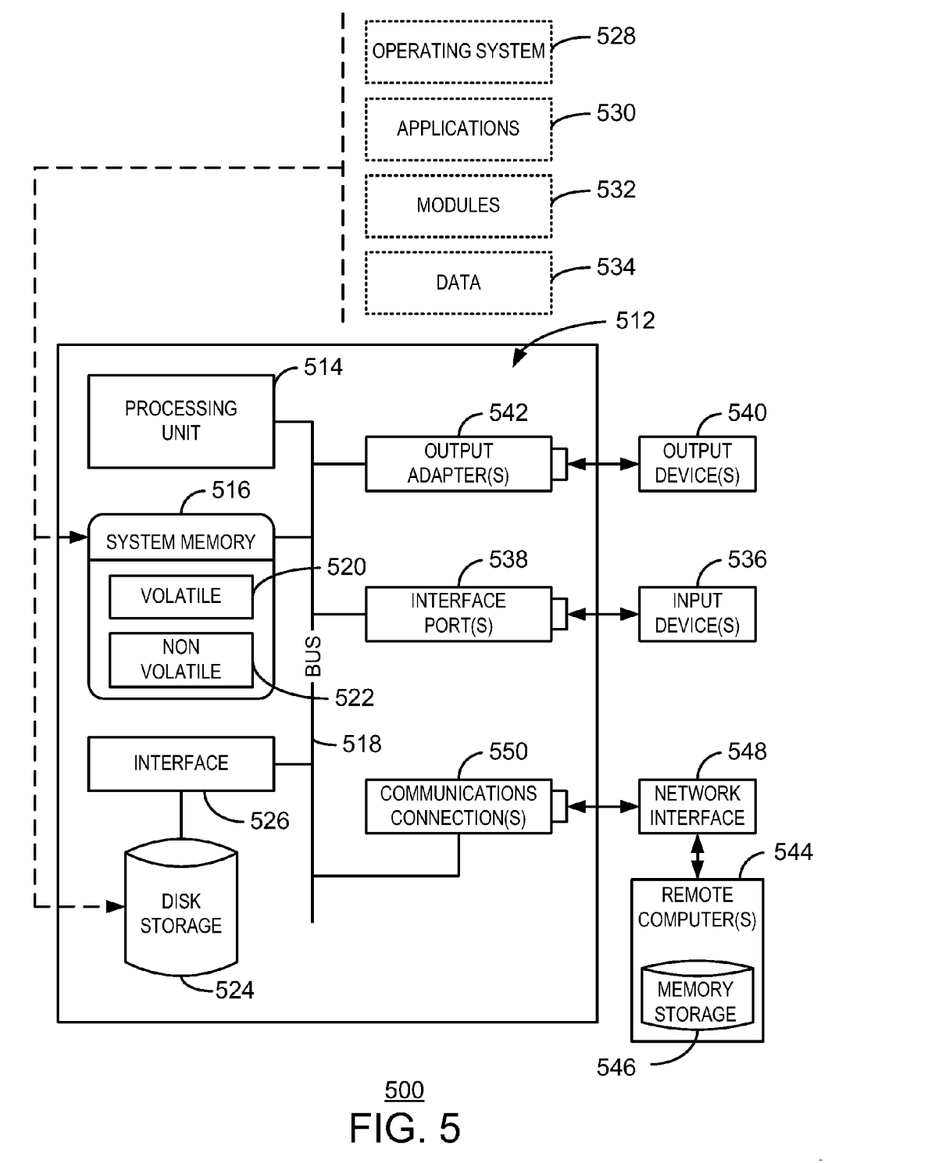
FIG. 5 is a block diagram of an exemplary operating environment for implementing various aspects of the claimed subject matter.

With reference to FIG. 5, an exemplary operating environment 500 is shown for implementing various aspects of the claimed subject matter. The exemplary operating environment 500 includes a computer 512. The computer 512 includes a processing unit 514, a system memory 516, and a system bus 518.

The system bus 518 couples system components including, but not limited to, the system memory 516 to the processing unit 514. The processing unit 514 can be any of various available processors. Dual microprocessors and other multi-processor architectures also can be employed as the processing unit 514.

The system bus 518 can be any of several types of bus structure(s) including the memory bus or memory controller, a peripheral bus or external bus, and/or a local bus using any variety of available bus architectures known to those of ordinary skill in the art. The system memory 516 comprises non-transitory computer-readable storage media that includes volatile memory 520 and nonvolatile memory 522.

The basic input/output system (BIOS), containing the basic routines to transfer information between elements within the computer 512, such as during start-up, is stored in nonvolatile memory 522. By way of illustration, and not limitation, nonvolatile memory 522 can include read only memory (ROM), programmable ROM (PROM), electrically programmable ROM (EPROM), electrically erasable programmable ROM (EEPROM), or flash memory.

Volatile memory 520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink™ DRAM (SLDRAM), Rambus® direct RAM (RDRAM), direct Rambus® dynamic RAM (DRDRAM), and Rambus® dynamic RAM (RDRAM).

The computer 512 also includes other non-transitory computer-readable media, such as removable/non-removable, volatile/non-volatile computer storage media. FIG. 5 shows, for example a disk storage 524. Disk storage 524 includes, but is not limited to, devices like a magnetic disk drive, floppy disk drive, tape drive, Jaz drive, Zip drive, LS-100 drive, flash memory card, or memory stick.

In addition, disk storage 524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 524 to the system bus 518, a removable or non-removable interface is typically used such as interface 526.

It is to be appreciated that FIG. 5 describes software that acts as an intermediary between users and the basic computer resources described in the suitable operating environment 500. Such software includes an operating system 528. Operating system 528, which can be stored on disk storage 524, acts to control and allocate resources of the computer system 512.

System applications 530 take advantage of the management of resources by operating system 528 through program modules 532 and program data 534 stored either in system memory 516 or on disk storage 524. It is to be appreciated that the claimed subject matter can be implemented with various operating systems or combinations of operating systems.

A user enters commands or information into the computer 512 through input device(s) 536. Input devices 536 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 536 connect to the processing unit 514 through the system bus 518 via interface port(s) 538. Interface port(s) 538 include, for example, a serial port, a parallel port, a game port, and a universal serial bus (USB).

Output device(s) 540 use some of the same type of ports as input device(s) 536. Thus, for example, a USB port may be used to provide input to the computer 512, and to output information from computer 512 to an output device 540.

Output adapter 542 is provided to illustrate that there are some output devices 540 like monitors, speakers, and printers, among other output devices 540, which are accessible via adapters. The output adapters 542 include, by way of illustration and not limitation, video and sound cards that provide a means of connection between the output device 540 and the system bus 518. It can be noted that other devices and/or systems of devices provide both input and output capabilities such as remote computer(s) 544.

The computer 512 can be a server hosting various software applications in a networked environment using logical connections to one or more remote computers, such as remote computer(s) 544. The remote computer(s) 544 may be client systems configured with web browsers, PC applications, mobile phone applications, and the like.

The remote computer(s) 544 can be a personal computer, a server, a router, a network PC, a workstation, a microprocessor based appliance, a mobile phone, a peer device or other common network node and the like, and typically includes many or all of the elements described relative to the computer 512.

For purposes of brevity, only a memory storage device 546 is illustrated with remote computer(s) 544. Remote computer(s) 544 is logically connected to the computer 512 through a network interface 548 and then connected via a wireless communication connection 550.

Network interface 548 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 550 refers to the hardware/software employed to connect the network interface 548 to the bus 518. While communication connection 550 is shown for illustrative clarity inside computer 512, it can also be external to the computer 512. The hardware/software for connection to the network interface 548 may include, for exemplary purposes only, internal and external technologies such as, mobile phone switches, modems including regular telephone grade modems, cable modems and DSL modems, ISDN adapters, and Ethernet cards.

An exemplary processing unit 514 for the server may be a computing cluster comprising Intel® Xeon CPUs. The disk storage 524 may comprise an enterprise data storage system, for example, holding thousands of impressions.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for split billing on a mobile computing device, comprising:
    receiving a token that specifies conditions under which network traffic is billed against a third party for content requested from the mobile computing device;
    matching network traffic between the mobile computing device and a content provider based on the conditions specified by the token;
    metering the matched network traffic to a billing account for the third party;
    crediting a data service charge for the matched network traffic on an account for the mobile computing device; and
    charging the third party for the data service charge
    wherein the matched network traffic is processed by a user application that notifies the third party of a geographic location of the mobile computing device,
    wherein the mobile computing device is configured to credit a plurality of data service charges to a plurality of third parties, based on a plurality of tokens, each token comprised of a subscriber identity module issued by a content provider.

2. The method recited in claim 1, wherein a trusted execution environment is used to perform the matching and the metering.

3. The method recited in claim 1, wherein the data service charge comprises a mobile network bandwidth cost of a request for the content requested.

4. The method recited in claim 1, comprising periodically producing a bill for the mobile computing device, wherein the bill
    comprises the credited data service charge.

5. The method recited in claim 1, wherein a mobile operator charges a user of the mobile computing device for all network traffic, and wherein the third party compensates the user for the data service charges.

6. The method recited in claim 1, wherein the content provider comprises one of:
    a cloud service; or
    a website.

7. A system for split billing, comprising:
    a processing unit; and
    a system memory, wherein the system memory comprises code configured to direct the processing unit to:
        receive a token that specifies conditions under which network traffic is allowed to be billed against a third party for content requested from the mobile computing device;
        match, using a secure runtime environment, network traffic between the mobile computing device and a content provider to the conditions specified by the token;
        meter, using the secure runtime environment, the matched network traffic to a billing account for the third party;
        credit a data service charge for the matched network traffic on an account for the mobile computing device; and
        charge the third party for the data service charge, wherein the data service charge comprises a mobile network bandwidth cost of a request for the content requested,
        wherein the matched network traffic is processed by a user application that notifies the third party of a geographic location of the mobile computing device, wherein the mobile computing device is configured to credit a plurality of data service charges to a plurality of third parties, based on a plurality of tokens, each token comprised of a subscriber identity module issued by a content provider.

8. The system recited in claim 7, wherein the code comprises the secure runtime environment.

9. The system recited in claim 7, wherein the content provider comprises the third party.

10. The system recited in claim 7, comprising code configured to direct the processing unit to periodically produce a bill for the mobile computing device, wherein the bill comprises the credited data service charge.

11. The system recited in claim 7, wherein a mobile operator charges a user of the mobile computing device for all network traffic, and wherein the third party compensates the user for the data service charge.

12. The system recited in claim 7, wherein a mobile operator charges the third party for the data service charge.

* * * * *